United States Patent
Lee et al.

(10) Patent No.: US 7,185,866 B2
(45) Date of Patent: Mar. 6, 2007

(54) DISPLAY APPARATUS

(75) Inventors: Kyung-kyun Lee, Seoul (KR); Byung-jo Kang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 4 days.

(21) Appl. No.: 10/618,613

(22) Filed: Jul. 15, 2003

(65) Prior Publication Data

US 2004/0051742 A1    Mar. 18, 2004

(30) Foreign Application Priority Data

Sep. 16, 2002  (KR)  ............... 2002-56196

(51) Int. Cl.
*A47H 1/10* (2006.01)
(52) U.S. Cl. ............ 248/328; 248/923; 348/825; 361/681
(58) Field of Classification Search ........... 248/918, 248/328, 329, 919, 917, 291.1, 371, 922, 248/923; 361/681, 683; 348/825, 831, 836, 348/794
See application file for complete search history.

(56) References Cited

U.S. PATENT DOCUMENTS

| | | | |
|---|---|---|---|
| 1,448,024 A * | 3/1923 | Brizgis ............... 248/455 |
| 6,256,027 B1 | 7/2001 | Jeong et al. |
| 6,334,687 B1 | 1/2002 | Chino et al. |
| 6,402,109 B1 * | 6/2002 | Dittmer ............... 248/284.1 |
| 6,754,070 B2 * | 6/2004 | Chen ............... 361/683 |
| 6,923,413 B2 * | 8/2005 | Dozier ............... 248/294.1 |
| 2002/0011032 A1 | 1/2002 | Choi |

FOREIGN PATENT DOCUMENTS

| CN | 1218350 A | 6/1999 |
|---|---|---|
| CN | 1218350 C | 6/1999 |
| CN | 2465203 Y | 12/2001 |
| EP | 0571702 A2 * | 12/1993 |
| EP | 1132024 | 9/2001 |

(Continued)

OTHER PUBLICATIONS

International Publication No. WO 03/036950 A1, Min, May 1, 2003, PCT.*

(Continued)

*Primary Examiner*—Alfred Joseph Wujciak, III
(74) *Attorney, Agent, or Firm*—Staas & Halsey LLP

(57) ABSTRACT

A display apparatus includes a display body having a display part, a supporting bracket attached to a wall and a angle control part connected to the supporting bracket to adjust a tilting angle of the display body. The display apparatus also includes a driving part to drive the angle control part to adjust the tilting angle of the display body, an input part for a user to adjust the tilting angle, an OSD generating part to generate an OSD signal to control the tilting angle, and a controller to control the driving part so that a tilting angle adjusting menu is displayed based on the OSD signal generated by the OSD generating part according to the input part, so that the tilting angle of the display body is adjusted according to a selection based on the tilting angle adjusting menu. Thus, the display apparatus may control the tilting angle of the display body minutely and easily by the OSD.

10 Claims, 9 Drawing Sheets

FOREIGN PATENT DOCUMENTS

| | | | |
|---|---|---|---|
| JP | 63253427 A | * | 10/1988 |
| JP | 03020774 A | * | 1/1991 |
| JP | 8-22254 | | 1/1996 |
| JP | 8-160878 | | 6/1996 |
| JP | 9-179504 | | 7/1997 |
| JP | 10-174021 | | 6/1998 |
| JP | 11-321472 | | 11/1999 |
| JP | 11-344934 | | 12/1999 |
| JP | 2000-216553 | | 8/2000 |
| JP | 2000-297897 | | 10/2000 |
| JP | 2001-75487 | | 3/2001 |
| JP | 2001-134199 | | 5/2001 |
| JP | 2001236024 A | * | 8/2001 |
| JP | 2001-309276 | | 11/2001 |
| JP | 2001-339498 | | 12/2001 |
| KR | 20-209456 | | 10/2000 |
| KR | 20-248228 | | 9/2001 |

OTHER PUBLICATIONS

SIPO Office Action issued Nov. 26, 2004.

* cited by examiner

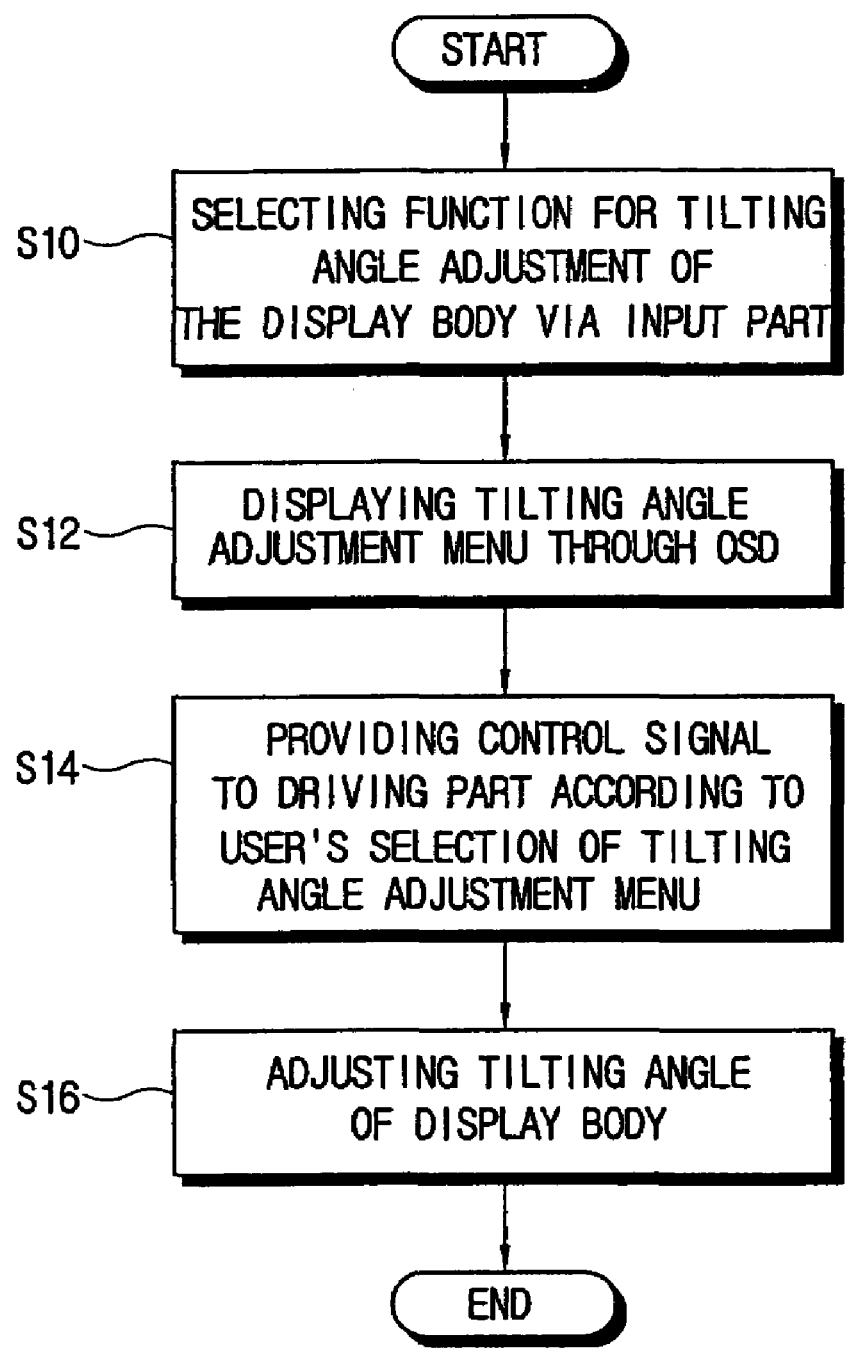

DISPLAY APPARATUS

CROSS-REFERENCE TO RELATED APPLICATIONS

This application claims the benefit of Korean Application No. 2002-56196, filed Sep. 16, 2002, in the Korean Intellectual Property Office, the disclosure of which is incorporated herein by reference.

BACKGROUND OF THE INVENTION

1. Field of the Invention

The present invention relates to a display apparatus, and more specifically, to a display apparatus which controls a tilting angle of a display body installed on a surface of a wall.

2. Description of the Related Art

Conventionally, a display apparatus includes a display body having a display part and an installing device in which the display body is installed.

Recently, as the display body having an LCD (Liquid Crystal Display) and a PDP (Plasma Display Panel) has been widespread, a size of the display part has become increasingly large and a thickness thereof has become relatively thin, so that the display body may be easily installed on a surface of a wall.

An installing device devised to install the display body on the surface of a wall is disclosed in the Japanese Patent Publication No. Hei 11-344934. The conventional installing device, as shown in FIG. 1, includes a display body 101 having a display part, a pair of arms 150 to support the display body 101, and a base 130 which is coupled to a lower part of the arms 150 by a hinge and attached to a surface of a wall 170. The conventional installing device also includes a mounting bracket 110, interposed between the arm 150 and the base 130, to make the display body 101 tilt.

The mounting bracket 110 includes a first link 113, a second link 117, and a locking device 116. One end of the first link 113 is rotatably coupled to an upper part of the base 130. One end of the second link 117 is rotatably coupled to the arm 150, and the other end thereof is rotatably coupled to the other end of the first link 113. The locking device 116, disposed in a combination part of the first link 113 and the second link 117, controls a relative rotation of the first link 113 and the second link 117.

The locking device 116 has a compression coil spring (not shown) in an inside thereof. The relative rotation of the first link 113 and the second link 117 is controlled by the compression coil spring. At approximately seven tilted angles of the display body 101, the locking device 116 may control the relative rotation of the first link 113 and the second link 117. If a user intends to unlock the first link 113 and the second link 117, the user has to move the locking device 116 perpendicularly to a plane of the first link 113 and the second link 117, and then has to compress the compression coil spring. Thus, the first link 113 and the second link 117 may rotate freely.

Also, a damping part is disposed in the base 130. The damping part has a damper 160 supported by the base 130, and a wire 161 whose one end is connected to an upper part of the damper 160 and the other end is connected to the pair of arms 150. The damping part prevents the display body 101 from rotating rapidly and thereby falling forward by its weight when the first link 113 and the second link 117 is unlocked to rotate freely.

As described above, the conventional installing device includes the arm 150, the base 130 and the mounting bracket 110 interposed between the display body 101 and the surface of the wall 170, to thereby control the rotation of the display body 101 at predetermined rotation angles and thus to install the display body 101. Also, the damping part having the damper 160 and the wire 161 in the base 130 decreases a rotation speed of the display body 101 when the first link 113 and the second link 117 are unlocked.

However, in the conventional installing device, there are problems as follows. First, to adjust a tilting angle of the display body 101, immediately upon unlocking the first link 113 and the second link 117, the user has to rotate the display body 101. Thus, it is not easy to manipulate the tilting angle of the display body 101. Second, it is impossible to manipulate minutely the tilting angle of the display body 101 because the locking device 116 may install the display body 101 only at the predetermined rotation angles. Finally, the conventional installing device cannot install various sizes of display bodies 101 on the surface of a wall 170 because the conventional installing device is limited to be extended upward or downward.

SUMMARY OF THE INVENTION

Accordingly, it is an aspect of the present invention to provide a display apparatus capable of controlling a tilting angle of a display body minutely and easily by an On Screen Display (OSD).

The present invention is also achieved by providing a display apparatus capable of installing various size display bodies on a surface of a wall.

Additional aspects and advantages of the invention will be set forth in part in the description which follows and, in part, will be obvious from the description, or may be learned by practice of the invention.

The foregoing and/or other objects of the present invention are achieved by providing a display apparatus including a display body having a display part, a supporting bracket attached to a wall and an angle control part connected to the supporting bracket to adjust a tilting angle of the display body. The display apparatus also includes a driving part to drive the angle control part to adjust the tilting angle of the display body, an input part to receive an input to adjust the tilting angle, an OSD generating part to generate an OSD signal to control the tilting angle, and a controller to control the driving part so that a tilting angle adjusting menu is displayed based on the OSD signal generated by the OSD generating part according to the input part, so that the tilting angle of the display body is adjusted according to a selection based on the tilting angle adjusting menu.

According to an aspect of the invention, the angle control part includes a lower hinge part to allow the display body to tilt relative to the wall, and disposed in a lower part of a rear of the display body, a cable winding roller disposed in one of the display body and the supporting bracket, and a connection cable, wound about the cable winding roller, and having a free end connected to the other one of the display body and the supporting bracket. The angle control part also includes a cable guide roller to guide the connection cable, and the driving part drives the cable winding roller to be rotated, so that the connection cable is wound on and off the cable winding roller to adjust the tilting angle of the display body.

According to an aspect of the invention, the cable winding roller is disposed in the supporting bracket, and the free end of the connection cable is connected to the display body.

According to another aspect of the invention, a hanging hook is provided at the free end of the connection cable and a hanging part is disposed in the display body to hang the hanging hook.

According to an aspect of the invention, an adjusting bracket having a plurality of screw holes is provided along a length direction thereof, to allow the angle control part to move up and down according to a position in which one of the screw holes is engaged with a screw to couple the adjusting bracket to the supporting bracket.

BRIEF DESCRIPTION OF THE DRAWINGS

The above and/or other aspects and advantages of the present invention will become apparent and more readily appreciated from the following description of preferred embodiments, taken in conjunction with the accompany drawings of which:

FIG. 6 is a control flowchart of the display apparatus of FIG. 2;

DETAILED DESCRIPTION OF THE PREFERRED EMBODIMENT

Figure 1:
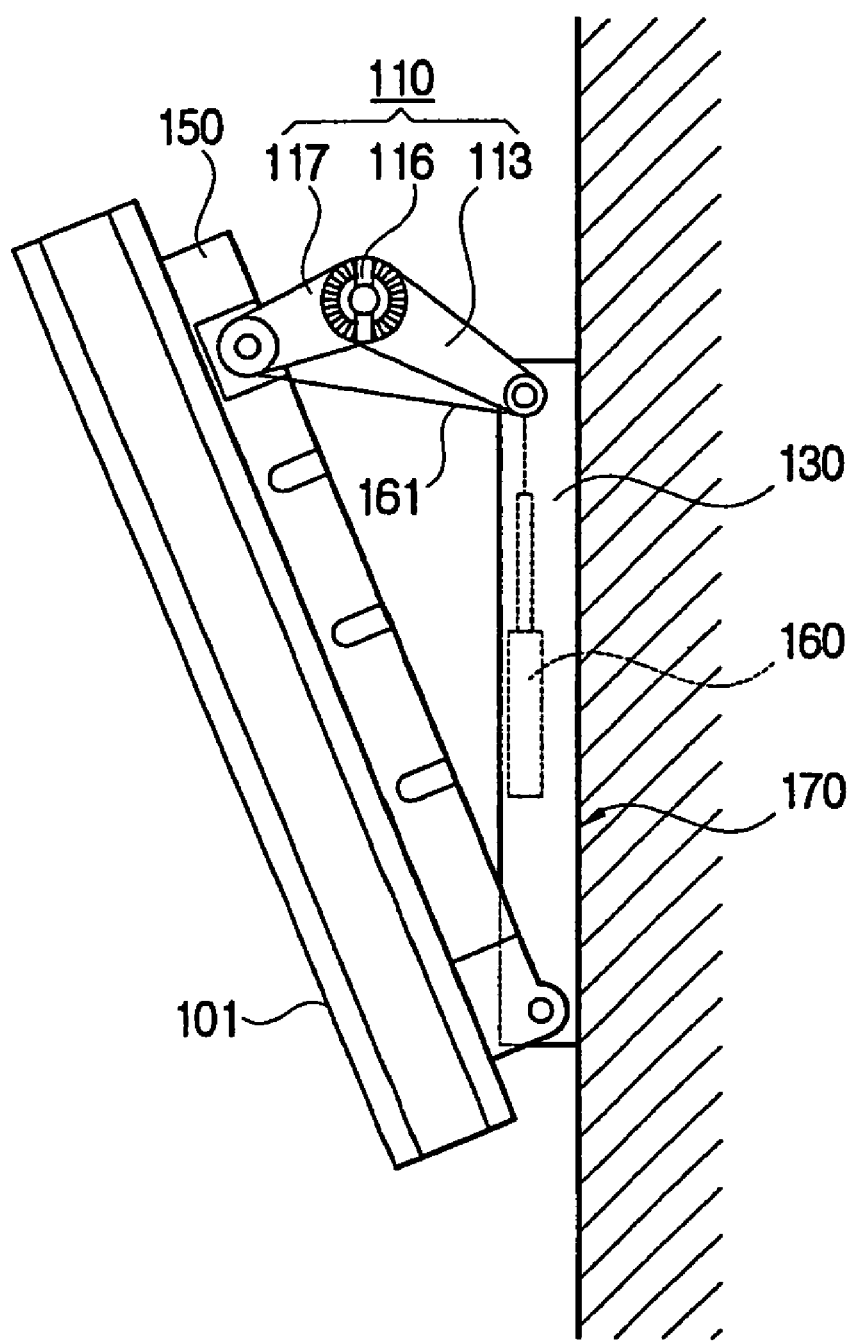
FIG. 1 is a side view of a conventional display apparatus.

Reference will now be made in detail to the present preferred embodiments of the present invention, examples of which are illustrated in the accompanying drawings, wherein like reference numerals refer to like elements throughout.

Figure 2:
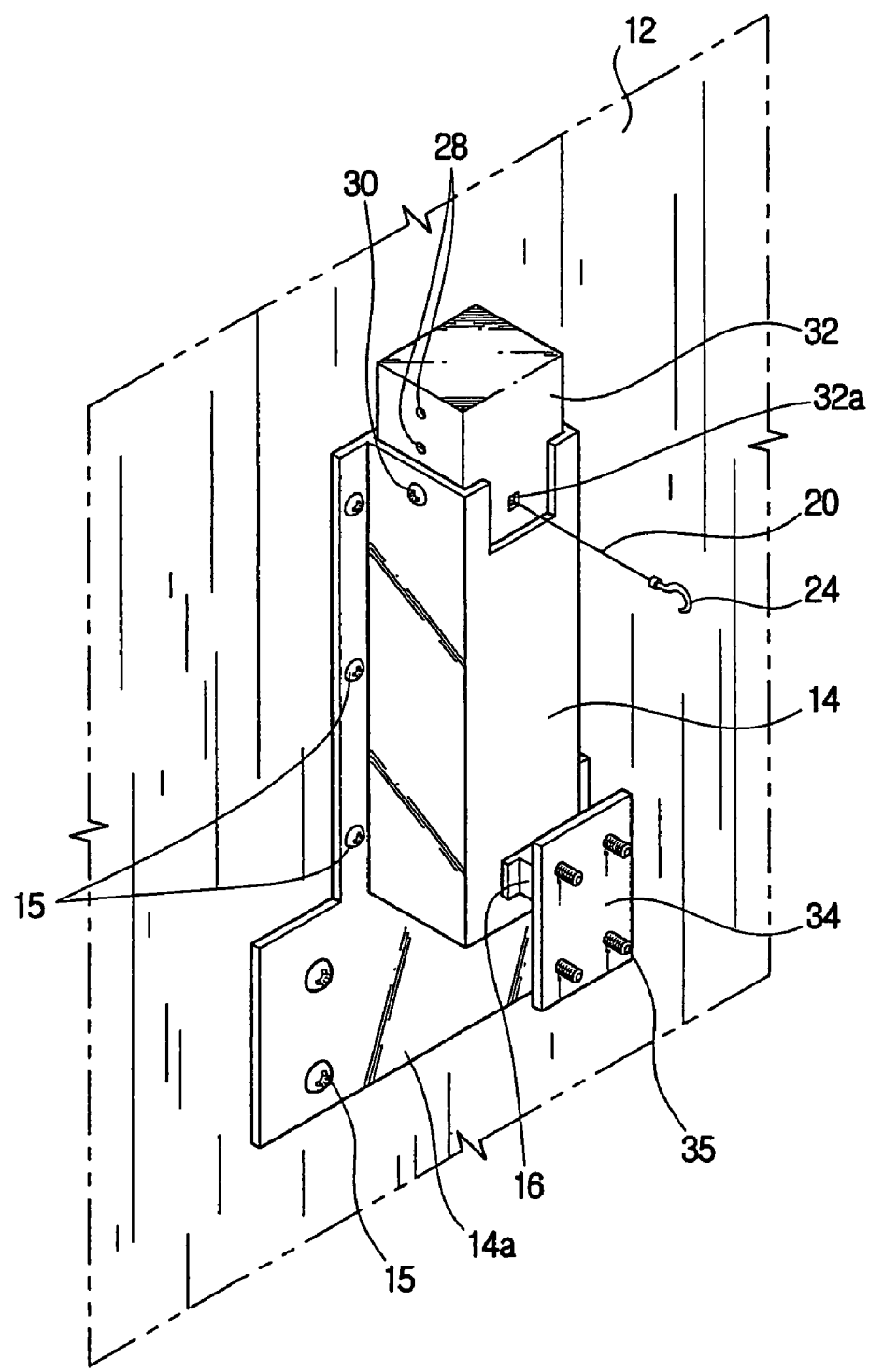
FIG. 2 is a perspective view of an installing device for a display apparatus, according to an embodiment of the present invention.
Figure 3:
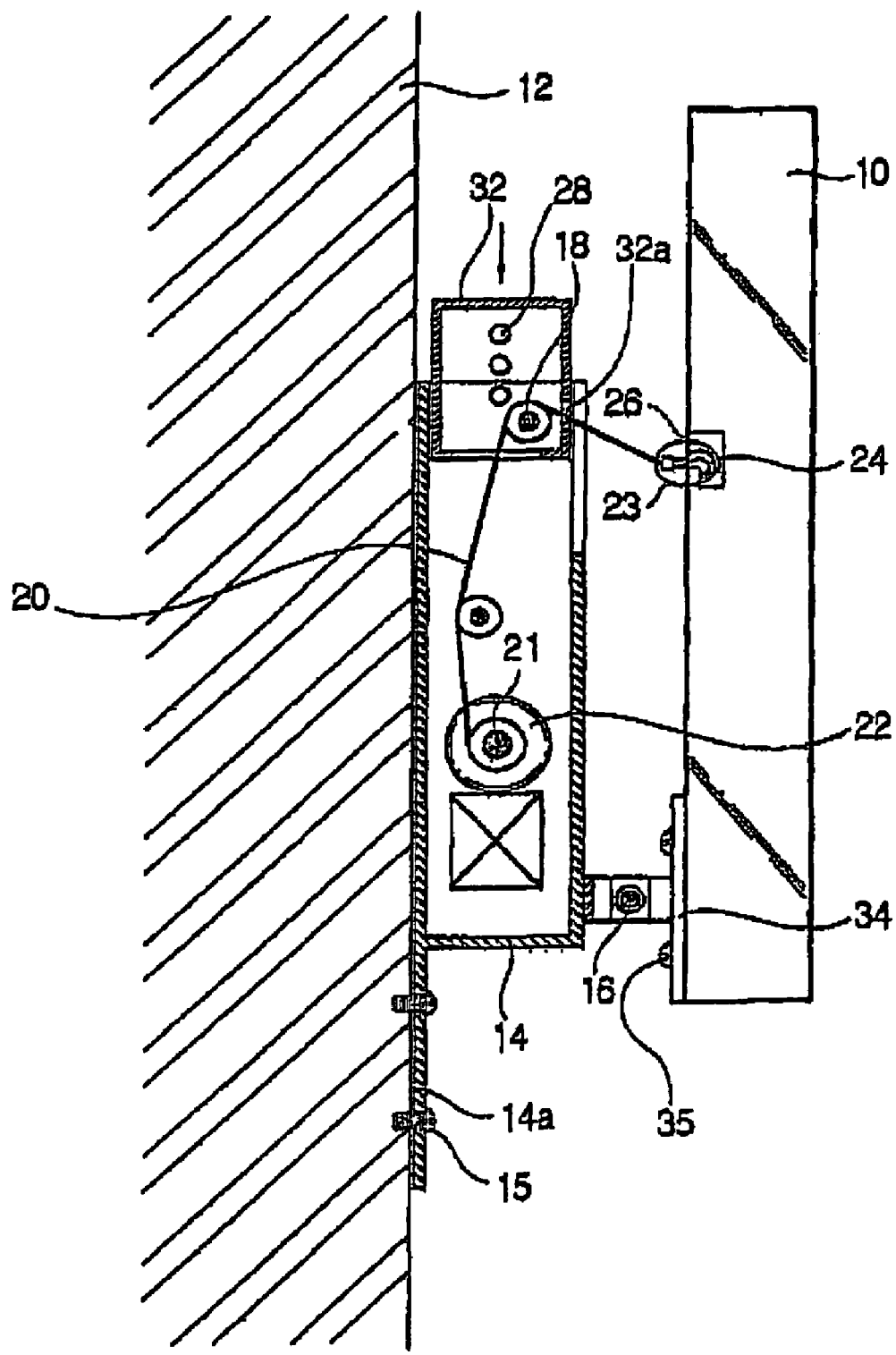
FIG. 3 is a schematic side sectional view of the display apparatus of FIG. 2.

FIG. 2 is a perspective view of an installing device of a display apparatus, according to an embodiment of the present invention, and FIG. 3 is a schematic side sectional view of the display apparatus. As shown in FIGS. 2 and 3, the display apparatus includes a display body 10 having a display part 40 (refer to FIGS. 5A and 5B) and an installing device to install the display body 10 to tilt on an installation surface. The installing device includes a supporting bracket 14 attached to a surface of a wall 12, an angle control part 44 (refer to FIG. 4) connected to the supporting bracket 14 to adjust a tilting angle of the display body 10, and a driving part 22 to drive the angle control part 44 to adjust the tilting angle of the display body 10.

The display body 10 has the display part 40 such as an LCD and a PDP in a front thereof. In an upper part of a rear of the display body 10, a hanging part 26 is disposed so that a hanging hook 24 of a connection cable 20 is hung. In a lower part of the rear of the display body 10, a plurality of screw holes (not shown) is formed so as to be screw-coupled with screws 35 to combine to a lower hinge part 16 (to be described later). An input part 42 (refer to FIGS. 5A and 5B) for a user to adjust the tilting angle is disposed on an outside of the display body 10.

The supporting bracket 14 has a case shape having a supporting plate 14a, and a plurality of screw holes (not shown) is disposed in the supporting plate 14a so that the supporting bracket 14 is coupled to the surface of the wall 12 by screws 15. Also, in a lower part of the supporting bracket 14, the lower hinge part 16 is disposed, and a mounting plate 34 is formed on the lower hinge part 16 in one body, formed with screw holes (not shown), so that the display body 10 is coupled to the mounting plate 34 by screws 35. Accordingly, the display body 10 is installed on the surface of the wall 12.

The supporting bracket 14 includes an adjusting bracket 32 to adjust a height of the supporting bracket 14 according to a size of the display body 10. The supporting bracket 14 has an upper opening and an inside thereof is hollowed so that the adjusting bracket 32 is partially accommodated by the supporting bracket 14.

The adjusting bracket 32 has a plurality of screw holes 28 along a length direction thereof so that a screw 30 couples the adjusting bracket 32 to the supporting bracket 14 by engaging with one of the screw holes 28. Also, a cable through hole 32a through which the connection cable 20 passes is formed in front of the adjusting bracket 32, so that a free end of the connection cable 20 that passes through the cable through hole 32a is connected to the display body 10.

According to a position of the screw 30 to be selectively engaged with one of the screw holes 28 disposed in the adjusting bracket 32, the adjusting bracket 32 moves up and down vertically. The cable through hole 32a disposed in the front of the adjusting bracket 32 also moves up and down vertically such that the height of the supporting bracket 14 is adjusted according to the size of the display body 10 (refer to FIG. 3).

For example, if the display body 10 is small, the adjusting bracket 32 is moved downward and the screw 30 is engaged with one of the screw holes 28 positioned at an upper end of the adjusting bracket 32 so that the small display body 10 is installed on the surface of the wall 12. On the contrary, if the display body 10 is large, the adjusting bracket 32 moves upward and is coupled to the supporting bracket 14 by the screw 30 so that a region for the display body 10 to be installed is enlarged.

The angle control part 44 includes the lower hinge part 16 to make the display body 10 tilt relative to the surface of the wall 12, the connection cable 20, a cable winding roller 21 on which the connection cable 20 is wound, and a cable guide roller 18 by which the connection cable 20 is guided.

The lower hinge part 16 makes the display body 10 tilt relative to the surface of the wall 12, and is disposed in the lower part of the rear of the display boy 10.

The cable winding roller 21 is disposed in the supporting bracket 14 and the connection cable 20 is wound about the cable winding roller 21. On the free end 23 of the connection cable 20, the hanging hook 24 is provided, which makes the display body 10 hang on the hanging part 26.

The driving part 22 drives the cable winding roller 21 to rotate so that the connection cable 20 is wound on and off the cable winding roller 21. Because the free end of the connection cable 20 is connected to the display body 10, as the connection cable 20 is wound on and off the cable winding roller 21, the connection cable 20 is guided by the cable guide roller 18 and the tilting angle of the display body 10 is adjusted.

A process to install the display apparatus on the surface of the wall 12 is described as follows.

At first, according to the size of the display body 10 to be installed on the surface of the wall 12, one screw hole 28 is selected among the screw holes 28 of the adjusting bracket 32, and the screw 30 couples the adjusting bracket 32 to the supporting bracket 14 by engaging with the screw hole 28. The supporting plate 14a of the supporting bracket 14 is then coupled to the surface of the wall 12 by the screws 15. Thus, the installing device is coupled to the surface of the wall 12.

The screws 35 couple the supporting bracket 14 to the display body 10 by engaging with screw holes of the mounting plate 34 extended from the lower hinge part 16 of the supporting bracket 14. The hanging hook 24 of the connection cable 20 passing through the cable through hole 32a of the adjusting bracket 32 is hung to the hanging part 26 disposed in the rear of the display body 10. Thus, the display apparatus is installed on the surface of the wall 12.

Figure 4:
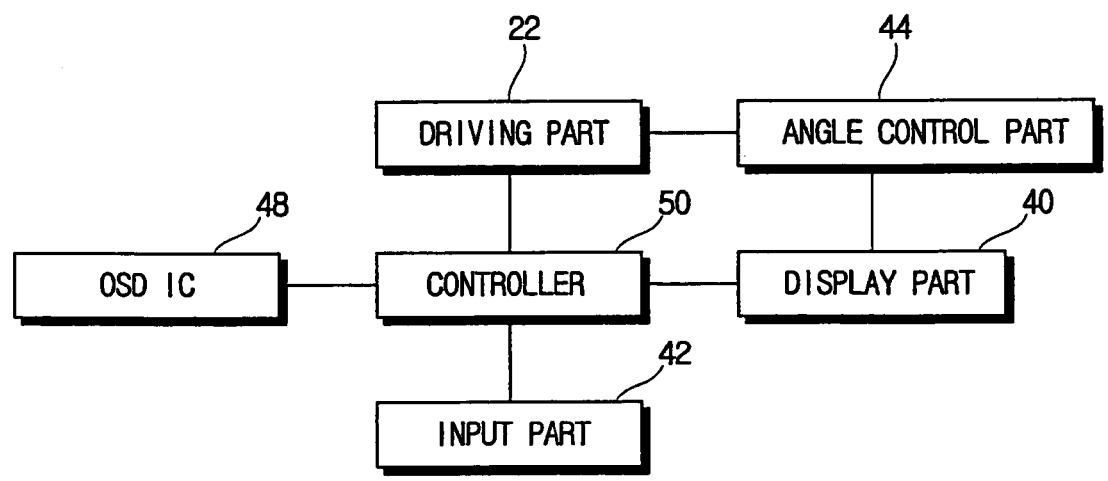
FIG. 4 is a control block diagram of the display apparatus of FIG. 2.

A control block diagram of the display apparatus with the above configuration is shown in FIG. 4. As shown in FIG. 4, the display body 10 of the display apparatus includes the display part 40 to display pictures, the input part 42 for the user to adjust the tilting angle, an OSD IC (On Screen Display Integrated Circuit) 48 to generate an OSD signal and a controller 50. As described above, the installing device also includes the driving part 22 and the angle control part 44.

The input part 42 is disposed on the outside of the display body 10. Via the input part 42, the user may input data to adjust the tilting angle of the display body 10 installed on the installing device. The input part 42 may be of a button type, or a hot key for the display apparatus of a computer.

The OSD IC 48 generates the OSD signal to adjust the tilting angle of the display body 10. If the user inputs the data to adjust the tilting angle of the display body 10 via the input part 42, the OSD IC 48 generates the OSD signal to adjust the tilting angle of the display body 10 and based on the signal thereof, the controller 50 displays a tilting angle adjustment menu on the display part 40 of the display body 10.

The controller 50 displays the tilting angle adjustment menu on the display part 40 as an OSD based on the OSD signal generated by the OSD IC 48 for the purpose of a tilting angle adjustment, according to a tilting angle adjustment input via the input part 42. Also, the controller 50 controls the driving part 22 so that the tilting angle of the display body 10 is adjusted according to a selection based on the tilting angle adjustment menu. The driving part 22 is actuated by a control signal of the controller 50, and thus, the driving part 22 drives the angle control part 44 to adjust the tilting angle of the display body 10. That is, the cable winding roller 21 is rotated by the driving part 22, on which the connection cable 20 is wound, so that the connection cable 20 is wound and unwound. Accordingly, the tilting angle of the display body 10 hung by the hanging hook 24 disposed in the free end of the connection cable 20 is adjusted and the tilting angle adjustment of the display body 10 becomes much easier by the lower hinge part 16.

Figure 5A:
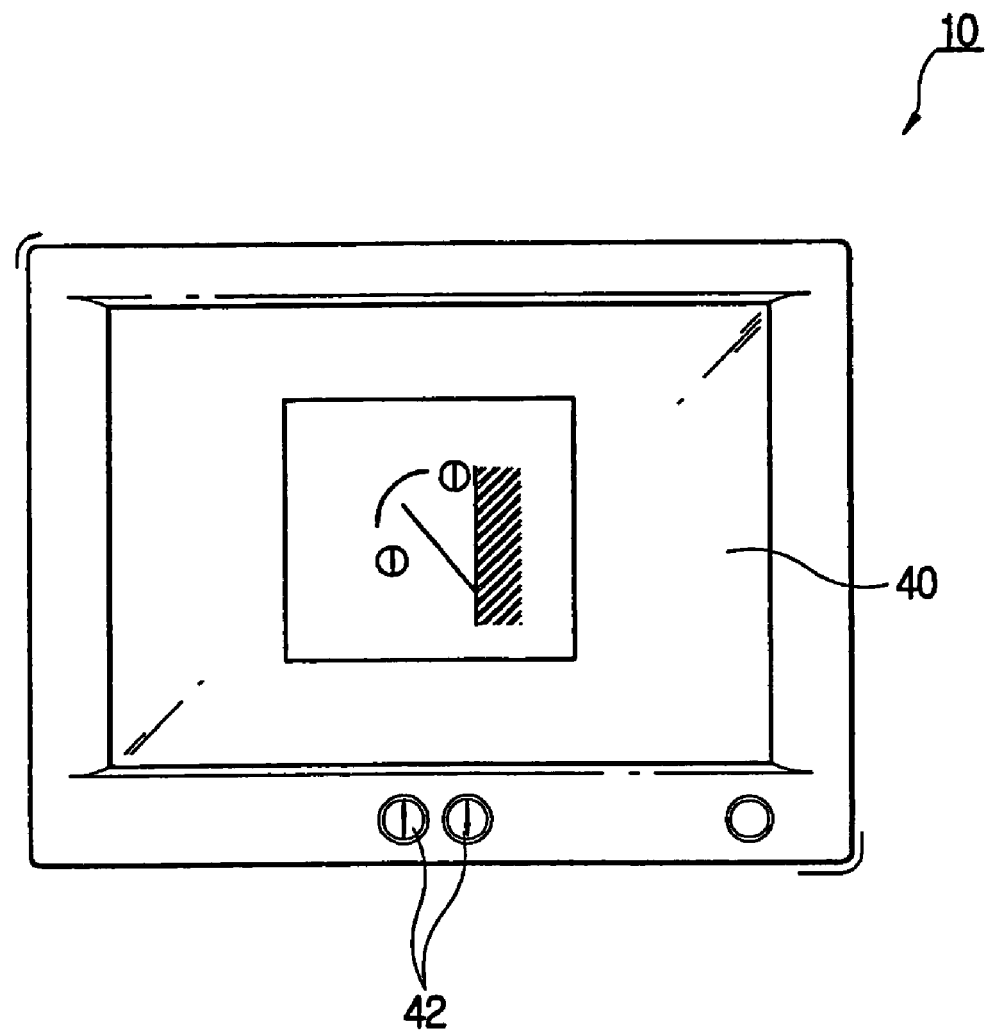
FIGS. 5A and 5B are exemplary views illustrating control of a tilting angle of a display body of the display apparatus of FIG. 2.
Figure 5B:
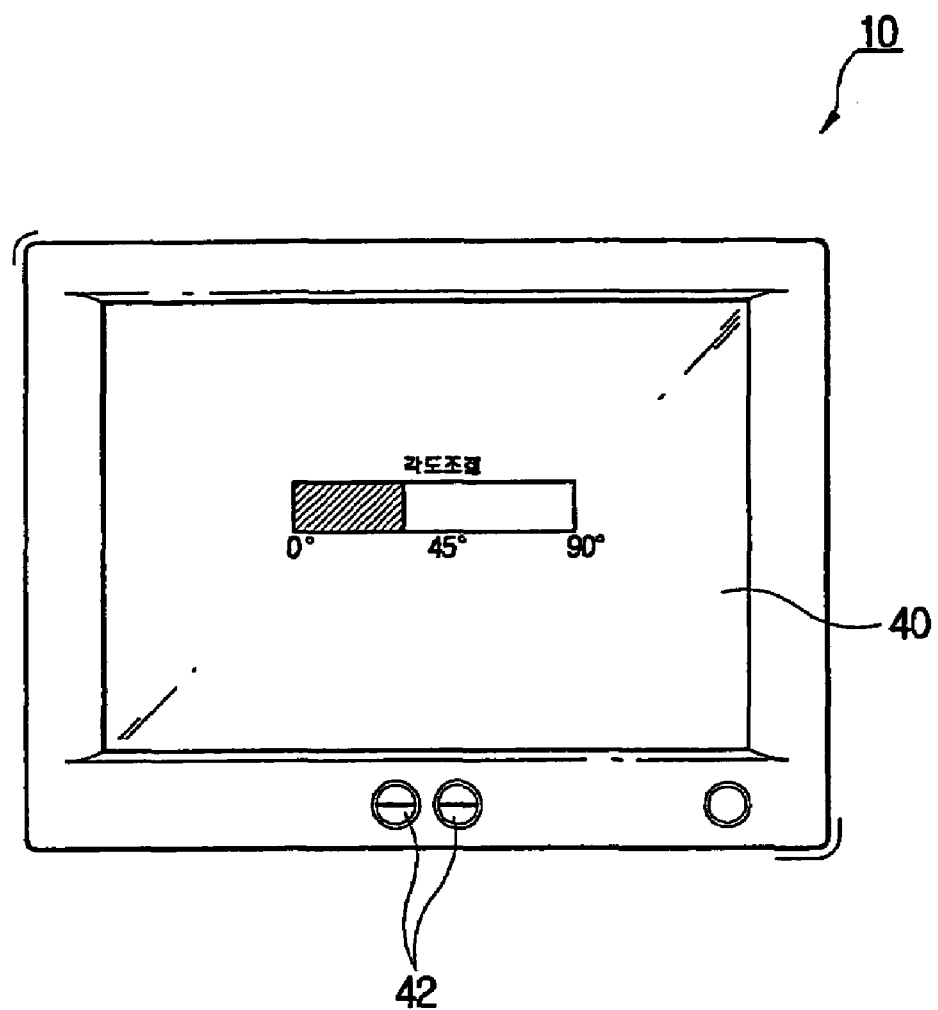

Exemplary views illustrating an OSD to control the tilting angle of the display body 10 are shown in FIGS. 5A and 5B. As shown in FIGS. 5A and 5B, the controller 50 displays the tilting angle adjustment menu on the display part 40 as the OSD based on the OSD signal generated from the OSD IC 48 by the tilting angle adjustment input via the input part 42. The present tilting angle of the display body 10 is shown in the displayed tilting angle adjustment menu.

FIG. 5A is a view illustrating an OSD displaying the upward and downward direction of the tilting angle of the display body 10, and the display body 10 installed on the surface of the wall 12. The OSD for the tilting angle adjustment is displayed by selecting the input part 42 disposed on the outside of the display body 10. Accordingly, the present tilting angle of the display body 10 may be confirmed by the OSD displaying how much the display body 10 is tilted from the surface of the wall 12. Also, the tilting angle of the display body 10 may be adjusted by selecting an upward and downward direction of the tilting angle via the input part 42 disposed on the outside of the display body 10.

FIG. 5B is a view illustrating the OSD displaying a tilting angle adjustment bar to adjust the tilting angle of the display body 10. The OSD for the tilting angle adjustment is displayed by selecting the input part 42 disposed on the outside of the display body 10. Accordingly, the present tilting angle of the display body 10 may be confirmed by the tilting angle adjustment bar. This displayed tilting angle is an angle of the display body 10 tilted from the surface of the wall 12. The tilting angle of the display 10 may be adjusted via the input part 42, disposed on the outside of the display body 10, through which a left and right direction of the input part may be selected.

The tilting angle of the display body 10 adjusted by using the display apparatus of the present invention according to the above configuration, is described by the control method of FIG. 6.

At first, the user installs the installing device for the display apparatus on the surface of the wall 12 and couples the display body 10 to the installing device for the display apparatus.

Figure 7:
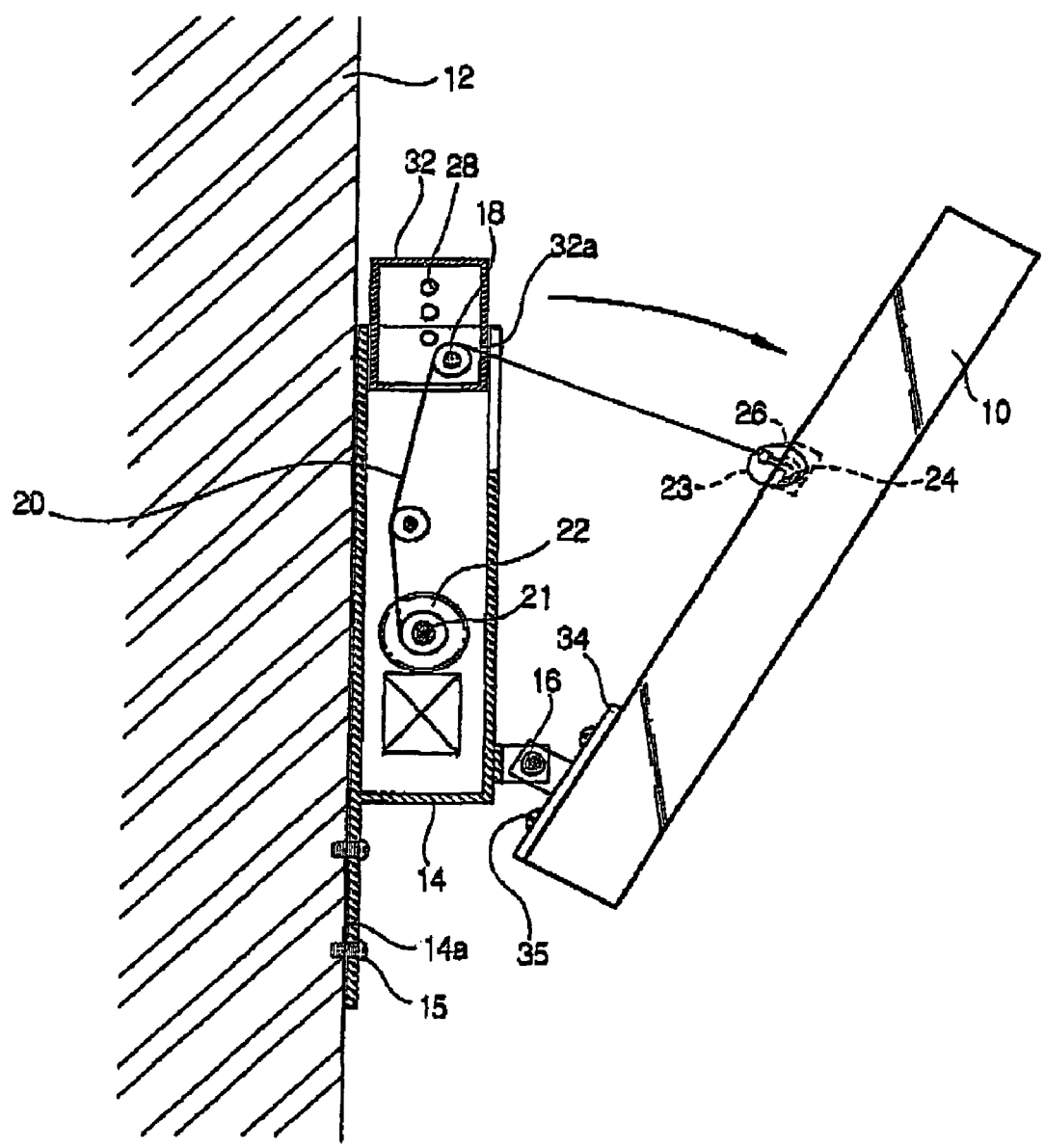
FIG. 7 is a cross sectional view illustrating a tilting angle adjustment of the display body of the display apparatus of FIG. 2.

If the user selects a function for the tilting angle adjustment of the display body 10 via the input part 42 to adjust the tilting angle of the display body 10 (at operation S10), the controller 50 displays the tilting angle adjustment menu of the display body 10 through the OSD (at operation S12). According to the selection based on the tilting angle adjustment menu of the display body 10, a control signal is provided to a driving part 22 (at operation S14), and thus, the driving part 22 is actuated. Then, the connection cable 20 is wound and unwound by rotation of the cable winding roller 21 connected to the driving part 22. Thus, the tilting angle of the display body 10 hung by the hanging hook 24 of the connection cable 20 is adjusted (at operation S16). FIG. 7 is a view illustrating the tilting angle of the display body 10 being adjusted by the above-described method.

As described above, the input part 42 is described as an up and down, and left and right arrow button. However, in the case of a television (TV) apparatus, the tilting angle of the display body 10 may be adjusted by inputting numerals in a remote control for the TV. The numerals must be able to be inputted into a tilting angle adjustment menu displayed as the OSD.

In the embodiment described above (refer to FIGS. 5A and 5B), it is described that the input part 42 to display the tilting angle adjusting menu is used together with the input part 42 to select the tilting angle adjusting menu. However, the input part 42 to display the tilting angle adjusting menu may be provided separately.

In the embodiment described above, it is described that the angle control part 44 includes the lower hinge part 16, the cable winding roller 21 and the connection cable 20, and thus, based on the tilting angle selected through the OSD, the driving part 22 drives the cable winding roller 21, so that the tilting angle of the display body 10 is adjusted. However, other types of the angle control part 44 may be provided, as the angle control part 44 has only to be actuated by the driving part 22, to adjust the tilting angle of the display body 10.

Figure 8:
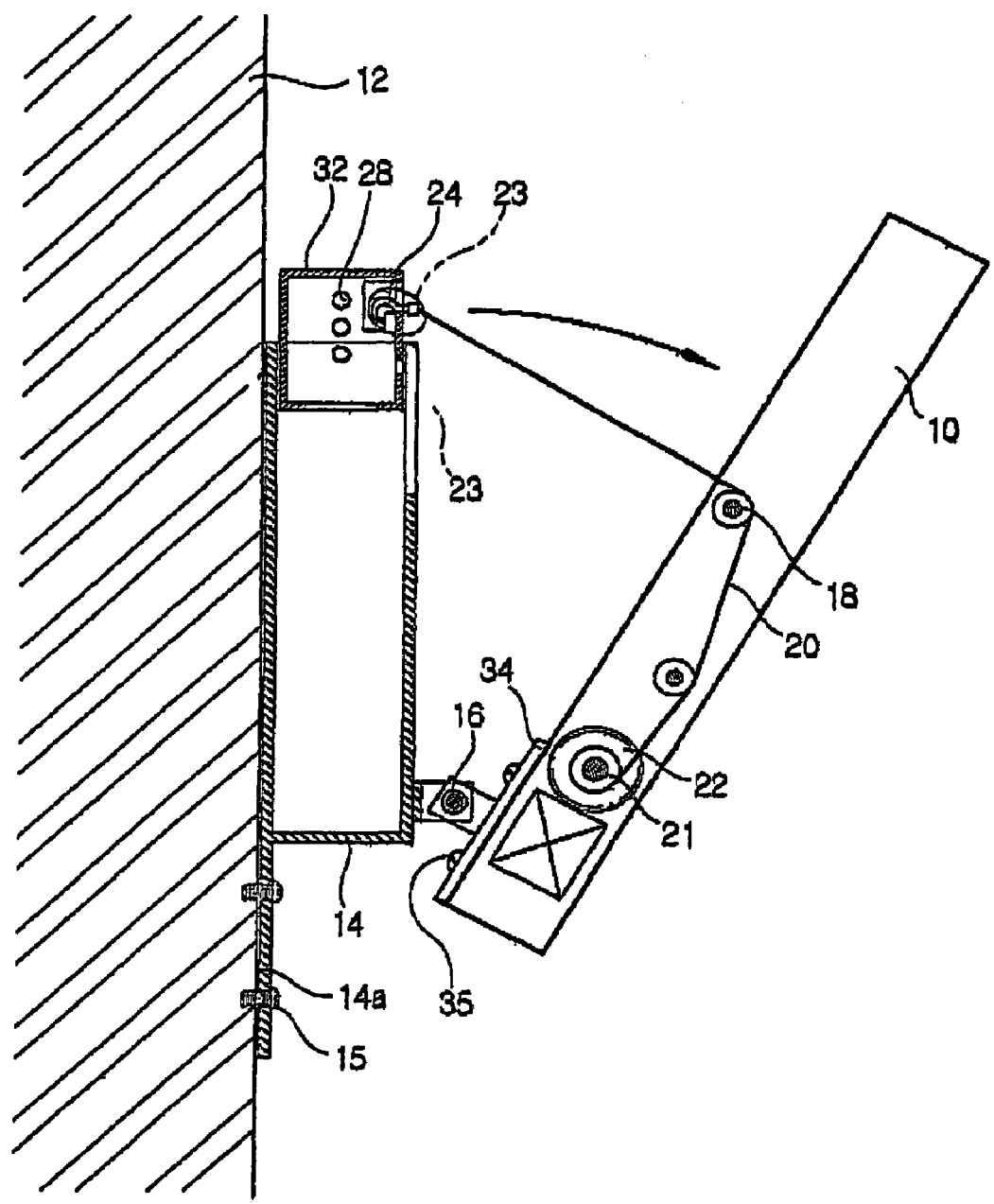
FIG. 8 is another cross sectional view illustrating a tilting angle adjustment of a display body of the display apparatus, according to another embodiment of the present invention.

In the embodiment described above, it is described that the cable winding roller 21 is disposed in the supporting bracket 14, but the cable winding roller 21 may be disposed in the display body 10, as illustrated in FIG. 8. In this case, the connection cable 20 is wound about the cable winding roller 21 disposed in the display body 10, and the free end of the connection cable 20 is connected to the supporting bracket 14.

The display apparatus includes the driving part 22 to drive the angle control part 44 to adjust the tilting angle of the display body 10, the input part 42 for the user to adjust the tilting angle, the OSD IC 48 to generate the OSD signal to control the tilting angle, and the controller 50 to control the driving part 22, so that the tilting angle adjustment menu is displayed based on the OSD signal generated by the OSD IC 48 according to the input part 42. Then, the tilting angle of the display body 10 is adjusted according to the selection based on the tilting angle adjustment menu.

As described above, the display apparatus is provided to control the tilting angle of the display body minutely and easily by an OSD. Also, the display apparatus is provided to install various sizes of display bodies on the surface of a wall.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus including a display body having a display part, a supporting bracket attached to a wall and an angle control part connected to the supporting bracket to adjust a tilting angle of the display body, the display apparatus comprising:
    a driving part disposed in one of the display body and the supporting bracket to drive the angle control part to adjust the tilting angle of the display body;
    an input part disposed in the display body to receive an input to adjust the tilting angle;
    an OSD generating part disposed in the display body to generate an OSD signal to control the tilting angle; and
    a controller disposed in the display body to control the OSD generating part so that a tilting angle adjusting menu is displayed according to the input part, to control the driving part so that the tilting angle of the display body is adjusted according to a selection based on the tilting angle adjusting menu.

2. The display apparatus according to claim 1, wherein the angle control part comprises:
    a lower hinge part to allow the display body to tilt relative to the wall, and disposed in a lower part of a rear of the display body;
    a cable winding roller disposed in one of the display body and the supporting bracket;
    a connection cable, wound about the cable winding roller, and having a free end connected to the other one of the display body and the supporting bracket; and
    a cable guide roller to guide the connection cable, wherein the driving part drives the cable winding roller to be rotated, so that the connection cable is wound on and off the cable winding roller to adjust the tilting angle of the display body.

3. The display apparatus according to claim 2, wherein the cable winding roller is disposed in the supporting bracket and the free end of the connection cable is connected to the display body.

4. The display apparatus according to claim 3, further comprising:
    a hanging hook provided at the free end of the connection cable; and
    a hanging part disposed at the display body to hang the hanging hook.

5. The display apparatus according to claim 2, further comprising:
    an adjusting bracket having a plurality of screw holes provided along a length direction thereof, to allow the angle control part to move up and down according to a position in which one of the screw holes is engaged with a screw to couple the adjusting bracket to the supporting bracket.

6. The display apparatus according to claim 5, wherein the adjusting bracket is provided to adjust a height of the supporting bracket according to a size of the display body.

7. The display apparatus according to claim 5, wherein the supporting bracket has an opening and an inside thereof is hollowed so that the adjusting bracket is partially accommodated by the supporting bracket.

8. The display apparatus according to claim 5, further comprising:
    a cable through hole provided on the adjusting bracket, to allow the connection cable to pass through, so that the free end of the connection cable is connected to the other one of the display body and the supporting bracket.

9. The display apparatus according to claim 1, wherein the tilting angle adjusting menu is one of a graph-type menu and a bar-type menu.

10. A method of controlling a display apparatus which includes a display body having a display part, a supporting bracket attached to a wall and an angle control part connected to the supporting bracket to adjust a tilting angle of the display body, the method comprising:
    driving the angle control part to adjust the tilting angle of the display body;
    adjusting the tilting angle with an input part;
    generating an OSD signal to control the tilting angle; and
    controlling the driving so that a tilting angle adjusting menu is displayed based on the OSD signal according to the input part, so that the tilting angle of the display body is adjusted according to a selection made based on the tilting angle adjusting menu.

* * * * *